Sept. 27, 1966     W. A. LLOYD ET AL     3,275,789

VACUUM BRAZING SYSTEM

Filed Sept. 9, 1963     3 Sheets-Sheet 1

INVENTORS
WILLIAM A. LLOYD
RENN ZAPHIROPOULOS
BY
ATTORNEY

INVENTORS
WILLIAM A. LLOYD
RENN ZAPHIROPOULOS
BY
ATTORNEY

Sept. 27, 1966  W. A. LLOYD ET AL  3,275,789
VACUUM BRAZING SYSTEM

Filed Sept. 9, 1963  3 Sheets-Sheet 3

INVENTORS
WILLIAM A. LLOYD
RENN ZAPHIROPOULOS
BY
ATTORNEY

United States Patent Office 3,275,789
Patented Sept. 27, 1966

3,275,789
VACUUM BRAZING SYSTEM
William A. Lloyd, San Jose, and Renn Zaphiropoulos, Los Altos, Calif., assignors to Varian Associates, Palo Alto, Calif., a corporation of California
Filed Sept. 9, 1963, Ser. No. 307,734
6 Claims. (Cl. 219—72)

This invention relates to vacuum systems, and more particularly to a continous cycle vacuum brazing system for use, for example, in the vacuum brazing of electrical components and the like.

There are many situations where it is advantageous. if not essential, to carry out an operation under vacuum such as, for example, the brazing of components for electron tubes, making metal-to-ceramic seals, firing many kinds of parts and materials, and the like. In the case of brazing, carrying out the operation under vacuum eliminates the possibility of oxidation for contamination on the parts to be brazed, or of porous brazes as a result of gas dissolving in the brazing material while it is in the liquid state.

Heretofore, vacuum brazing systems have had the disadvantage that continuous cycling so as to permit high production rates has not been possible. In a typical system of the prior art, a work piece would be placed in a bell jar, for example, the system evacuated, the work piece brazed, cooled for a period of time, then the system would be let up to air and the work piece removed. To vacuum braze another work piece, the entire process had to be repeated.

Accordingly, it is the object of this invention to provide a continuous cycle brazing system which permits high production rates.

One feature of the present invention is the provision of a vacuum brazing system including a plurality of spaced stations within the main vacuum chamber, at least one of said stations being a brazing station and another being a cooling station. whereby brazing and cooling may be carried on simultaneously.

Another feature of the present invention is the provision in a vacuum brazing system of the above type of a vacuum lock device whereby article receiving means may be introduced into and removed from said chamber without disturbing the vacuum within said chamber.

Still another feature of the present invention is the provision in a vacuum brazing system of any of the above types wherein evacuation of the main vacuum chamber is effected by means of a valveable cryopump and an electrical vacuum pump.

A further feature of the present invention is the provision in a vacuum brazing system of any of the above types of means for receiving articles to be brazed adapted to be heated at the brazing station by electron bombardment, the article receiving means forming an oven about the articles to be brazed.

These and other objects and features of the present invention and a fuller understanding of the invention may be had by referring to the following description and claims, taken in conjunction with the following drawings in which:

Figure 1:
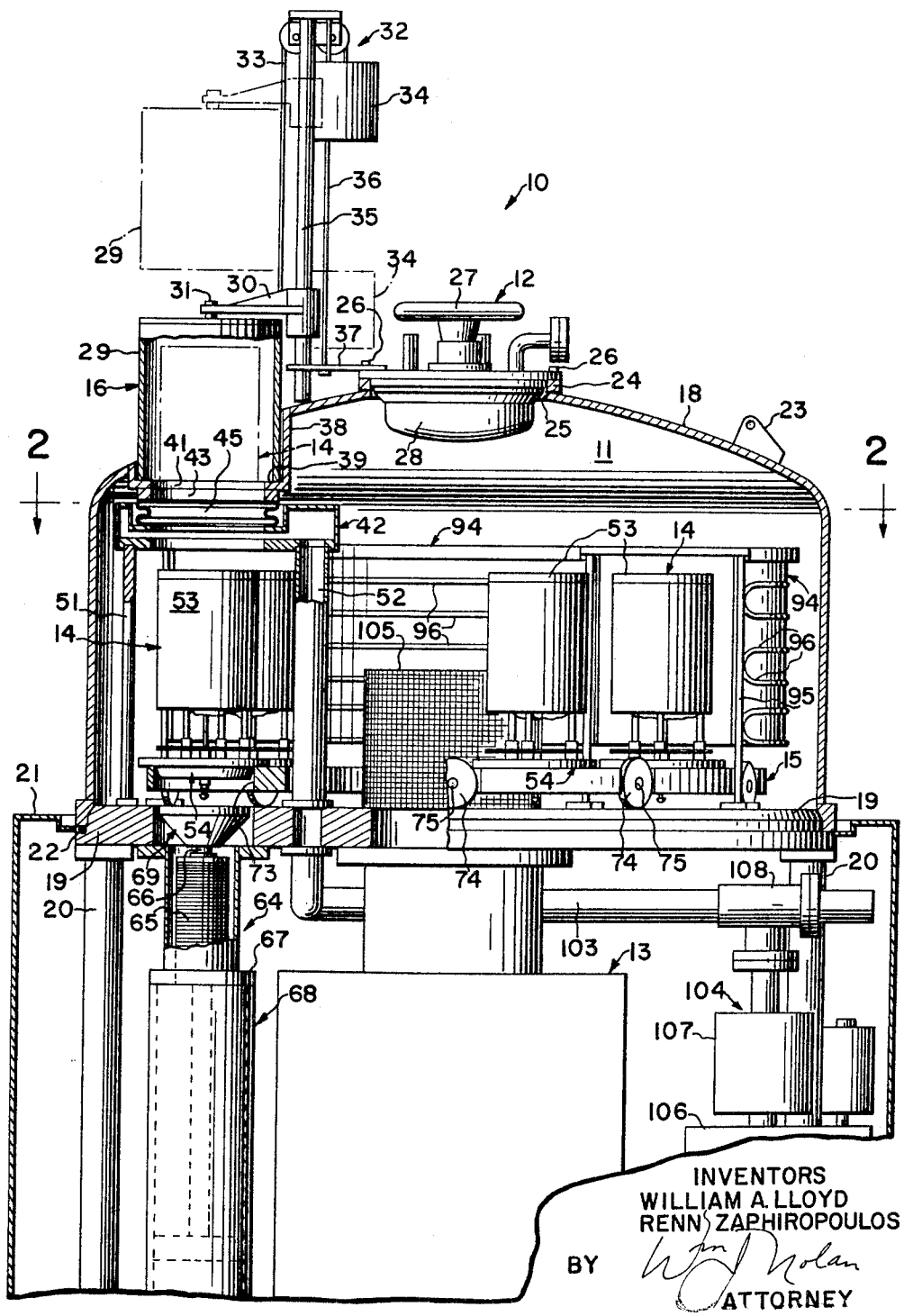
FIG. 1 is a cross-sectional view partly broken away of the vacuum brazing system of the present invention.

Referring now to the drawings, the vacuum brazing system 10 is shown as comprising an evacuable chamber 11; a valveable cryopump 12 and an electrical vacuum pump 13 for evacuating chamber 11; a plurality of spaced stations within this chamber 11 (A through J, FIG. 2); article receiving means 14; a movable table 15 to carry the article receiving means 14; a vacuum lock device 16 for introducing the article receiving means 14 into vacuum chamber 11 and depositing them on table 15, and for removing them from table 15 and taking them out of the chamber 11 without disturbing the vacuum within the chamber 11; and, means 17 (see FIG. 3) for moving the table 15 whereby the article receiving means are sequentially indexed to each of the stations. After the article receiving means 14 carrying the articles to be brazed and brazing material are introduced into chamber 11 and deposited on the table 15 at station A, table 15 is indexed, to station B for degassing, to station C for brazing, and stations D through J for cooling. Upon reaching station A again the article receiving means 14 is removed from the table and taken out of the chamber 11 and the brazed articles removed from the receiving means 14. In comparison with normal bell jar vacuum systems of the prior art, the system 10 is capable of a much higher production rate. Brazing time will be equally long and cooling time per part will be equal. The difference is that in prior art systems, after every brazing operation the parts that were brazed had to be given time to cool and then the system let up to air, whereas in the system 10 of the present invention, seven finished articles can be cooled within the chamber 11 while new work is being brazed, and the chamber 11 need never be let up to air.

Referring to FIG. 1, chamber 11 comprises an aluminum bell jar 18 seated on an aluminum base member 19 mounted to support rods 20 within a cabinet 21. An O-ring seal 22 of, for example, Viton-A is fitted in a groove in the base member 19 about its periphery and creates a vacuum tight seal when bell jar 18 is seated against the base member 19. Viewing ports (not shown) permit observation of the interior by an operator, if desired. The bell jar 18 is installed and removed with a portable hoist (not shown) and for this reason it is provided with eyelets 23 to which the hoist may be connected during raising and lowering.

Figure 3:
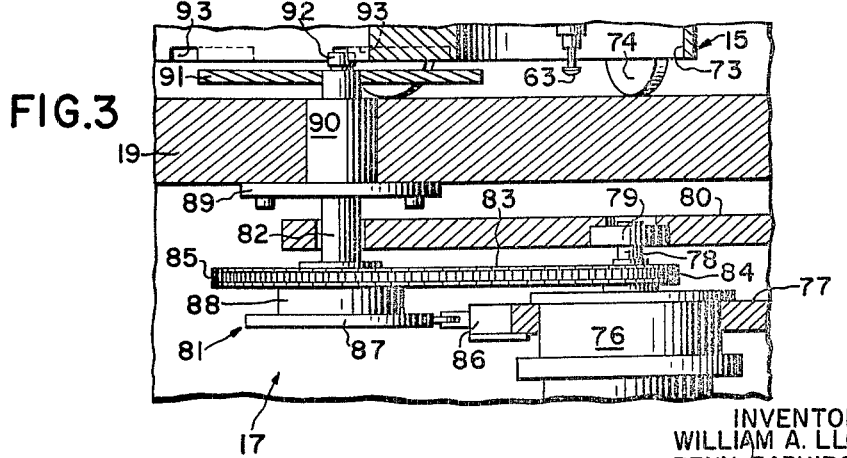
FIG. 3 is a cross-sectional view taken along the lines 3—3 of FIG. 2.

Evacuation of the chamber 11 is effected by a valveable cryopump 12 and an electrical vacuum pump 13. A flange member 24 is welded to an opening 25 in the upper portion of the bell jar 18. Bolted to this flange member 24, as at 26, is the valveable cryopump 12 of the type disclosed in U.S. patent application Serial No. 182,528 filed March 26, 1962, and assigned to the same assignee as the present invention, now Patent 3,156,406. This cryopump 12, while positioned within chamber 11 may be isolated therefrom by rotating the handle 27 to close a valve cover plate 28 about the cryo surfaces (not shown). In FIG. 3 the cryopump 12 is shown in closed position but ordinarily the cryo surfaces are opened to chamber 11 so as to pump by condensation, gases, water vapor and the like at very rapid rates of speed. Typically, the cryopump 12 when filled with liquid nitrogen will condense water vapor at 9400 liters per second. In closed position the cryo surfaces can be cleaned of condensibles and again utilized for further pumping action by rechilling the cryo surfaces but without disturbing the vacuum created within chamber 11.

Connected in vacuum tight communication to chamber 11 through base member 19 is the electrical vacuum pump 13, for example, a 1000 liters per second glow discharge vacuum pump of the type shown and disclosed in U.S. Patent No. 3,056,902 issued October 2, 1962.

Figure 5:
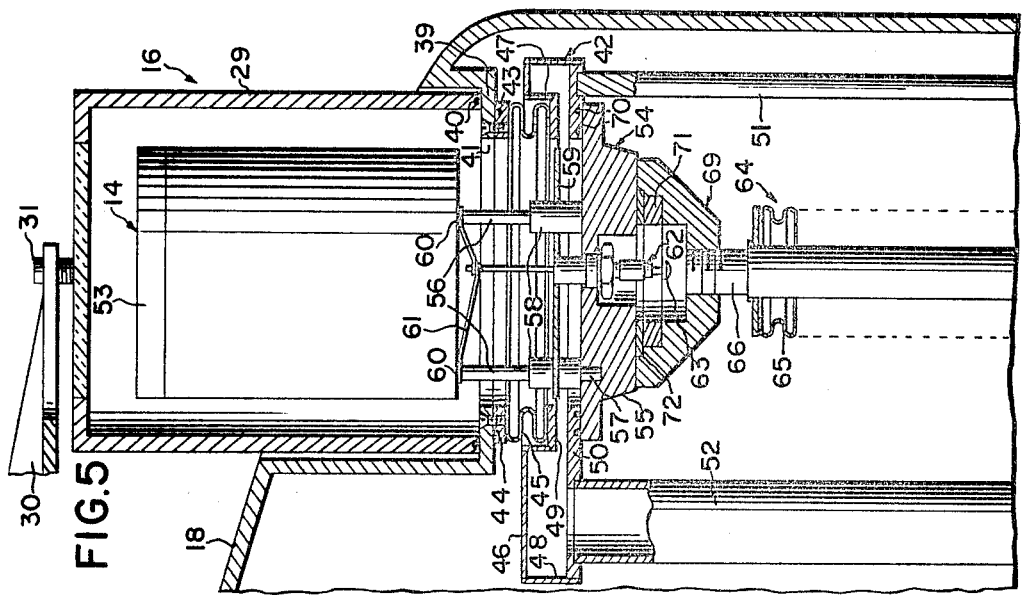
FIG. 5 is a cross-sectional view taken along the lines 5—5 of FIG. 2.

Referring now to FIGS. 1 and 5, the novel vacuum lock 16 of the present invention is shown as including an entrance-exit chamber 29 as of aluminum supported by a slidable bracket 30 to which it is bolted at 31. The bracket 30 is connected by means of a pulley system 32 and wire 33 to a counterweight 34, and will move vertically upward along the guide rod 35 when the counter weight 34 is driven downward along guide rod 36. The guide rods 35, 36 are held in position by a perforated plate 37 bolted to the cryopump 12 as at 26.

In closed position the chamber 29 slides within an opening towards the outer periphery of bell jar 18 having a cylindrical sidewall 38, to abut against a shoulder portion 39. An O-ring seal 40 fitted in a groove in the bottom of the chamber 29 assures a vacuum tight seal between chamber 29 and shoulder portion 39. An aperture 41 in the shoulder portion 39 provides communication to a lower stainless steel chamber 42 comprising: a bellows flange 43 bolted to shoulder portion 39 in vacuum tight communication by means of an O-ring seal 44; bellows 45; top plate 46; inner and outer wall members 47, 48; bellows plate 49; and bottom plate 50. A rod 51 and tube 52 mounted to base member 19 support chamber 42. In addition, tube 52 provides communication to a system (to be described hereafter) for roughing entrance-exit chamber 29 and bellows chamber 42.

A hollow canister 14, as for example, tantalum having a removable cover 53 which is adapted to receive a brazing jig (not shown) containing the parts to be brazed and the necessary brazing materials, is placed upon a platform 54 as of magnetic stainless steel. The platform 54 comprises a support plate 55, three ceramic insulator legs 56 mounted over metal rods 57 extending upwardly of said plate 55, a cylindrical evaporant shield member 58 as of stainless steel surrounding each insulator leg 56, and a heat shield plate 59 as of stainless steel mounted to shield members 58 above the plate 55. Metal caps 60 are placed on each ceramic insulator leg 56 and are connected through leads 61 to a single high voltage feedthrough 62 having a downwardly projecting contactor 63. In this way the canisters 14 may be raised to a high positive voltage to attract electrons.

Vertical travel for raising and lowering the platform 54 is controlled by a hydraulic ram 64 having a vacuum type bellows seal 65 connected to the ram shaft 66 at one end and to the entrance to the cylinder 67 of the hydraulic ram actuating mechanism 68 at the other end. In the raised position a pusher 69 brings the support plate 55 in contact with the bottom plate 50. A pair of O-rings 70 are placed within grooves in the bottom plate 50 towards its outer periphery so as to assure a vacuum tight fit between the two surfaces. An annular magnet 71 held within the pusher 69 by a retaining ring 72 prevents separation of the pusher 69 from the platform 54 should there be any vibration. In the lower position (see FIG. 1) the pusher 69 rests parallel to and within an opening in base member 19.

Figure 2:
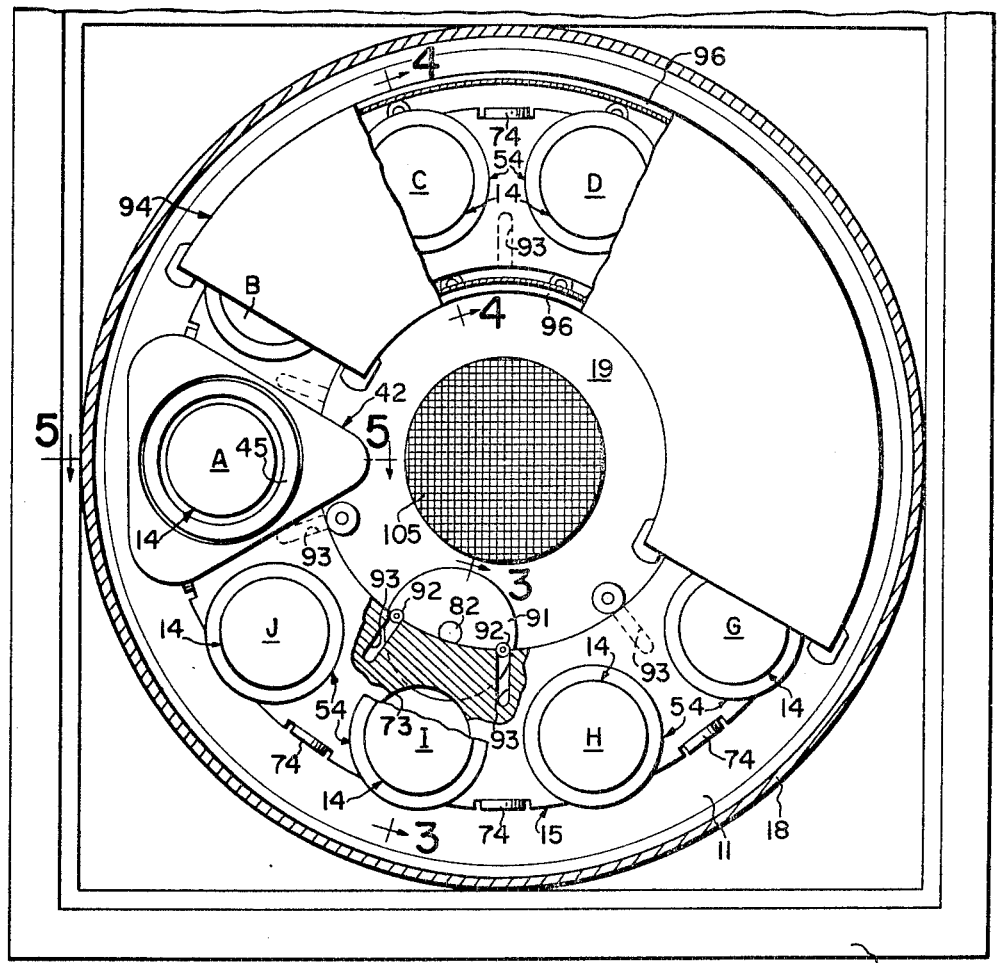
FIG. 2 is a cross-sectional view taken along the lines 2—2 of FIG. 1.

Referring now to FIGS. 1–3 there is shown the turntable 15, as of aluminum, having a series of openings 73 spaced about its outer periphery which are adapted to receive platforms 54. The turntable 15 is rotated clockwise within chamber 11 on ball bearing wheels 74 pivoted on axles 75 connected about the outer circumference of turntable 15.

Referring more particularly to FIGS. 2 and 3, there is shown the mechanism 17 for indexing the turntable 15. A motor 76 is supported on plate 77 and whose shaft 78 is held within bushing 79 on plate 80 actuates the indexing drive shaft assembly 81 including drive shaft 82 by means of a chain 83 mounted between sprocket wheels 84, 85. A micro-switch 86 mounted on the end of plate 77 is actuated every 180° of rotation of shaft 82 by cam surface 87 mounted on the hub 88 on the wheel 85 to shut off motor 76. Drive shaft assembly 81 is supported on a flange 89 bolted to the base member 19. The drive shaft 82 passes through a rotary vacuum seal 90 in the base member 19. A driver plate 91 is mounted on the end of drive shaft 82 within the chamber 11. Rollers 92 on drive plate 91 are adapted to slide into slots 93 in turntable 15. During rotation of the drive shaft 82 through 180° a roller 92 engages a slot 93 in turntable 15 and indexes it one position.

In traversing a circle within the chamber 11, the turntable 15 advances the platform 54 through the positions or stations (A through J in FIG. 2). At the first station after the vacuum lock 16 (station B), the parts to be brazed are being degassed from the heat generated at station C and at the same time have entered within an annular radiation shield 94 as of stainless steel, supported by rods and tubes 95 (see FIG. 1) mounted on base member 19. The shield 94 extends 180° around the circumference of turntable 15 and is cooled by water which passes through copper tubing 96 welded to the outer wall of the shield 94. Access is provided to the tubing 96 through one of the tubes 95 connected to the tubing 96. The purpose of shield 94 is to absorb heat radiated at the electron bombardment station (station C) and to minimize the heat picked up by the rest of the brazing system 10.

Figure 4:
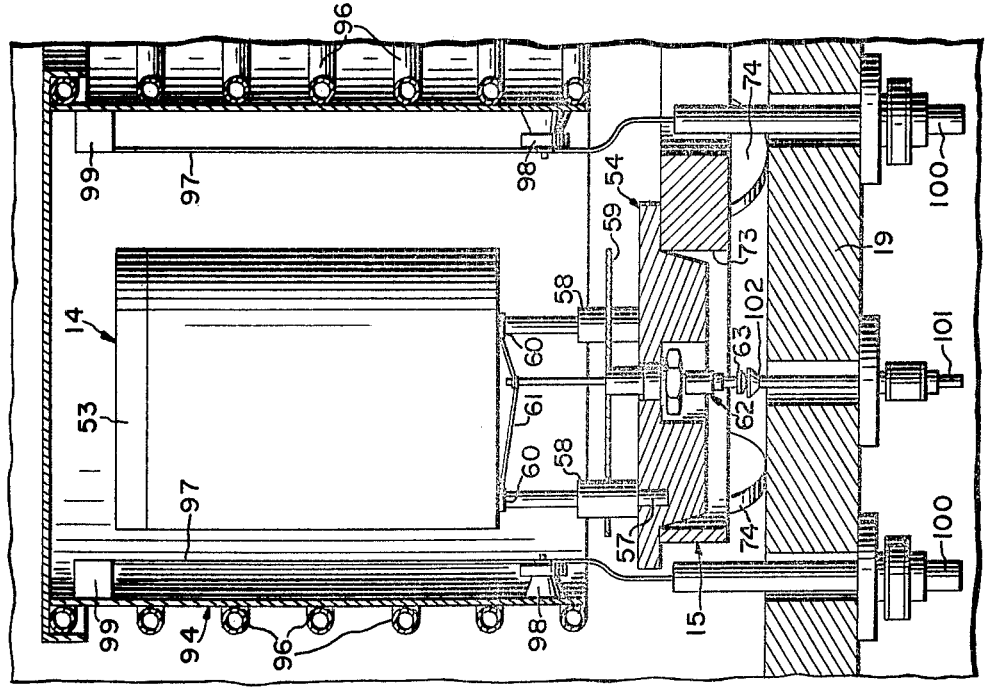
FIG. 4 is a cross-sectional view taken along the lines 4—4 of FIG. 2.

At station C the brazing operation is performed (see FIG. 4). High current, for example, 30–100 amperes is fed to four filaments 97 as of tantalum mounted to the shield 94 on ceramic insulators 98, 99. The current is fed from a power supply means (not shown) to a pair of high current feedthroughs 100 and thence to the filaments 97. A high voltage feedthrough 101 having an upwardly extending commutator 102 is positioned within the base member 19 in such a way that its commutator 102 makes electrical contact with a contactor 63 of feedthrough 62 when a platform 54 is advanced to station C. Feedthrough 101 is connected to power supply means (not shown) so that the canister 14 is placed at some high positive potential with respect to filament 97, for example, 6–8 kv.

Within the cabinet 21 are the hydraulic ram actuating mechanism 68; the electrical vacuum pump 13 mounted in vacuum tight communication to base member 19; and a conduit 103 leading from chamber 42 and tube 52 to a rough pumping system 104. A stainless steel screen 105 within chamber 11 confines the glow discharge in pump 13 when it is first being started after having been open to atmospheric pressure. In addition, screen 105 prevents extraneous material from falling into pump 13.

Rough pumping system 104 comprises a mechanical pump 106, for example, a 5-c.f.m. Kinney pump, a mechanical blower 107, for example, a 30-c.f.m. Kinney blower, and a high vacuum valve 108 for valving off the pump 106 and blower 107 from chamber 42.

Operation of the system is as follows. With a high vacuum ($10^{-5}$ to $10^{-7}$ torr) in the chamber 11, the cryopump 12 open to chamber 11, pump 13 operating, and platform 54 is raised position, the operator loads a brazing jig with the appropriate parts and brazing materials into a canister 14, and places the canister 14 on the insulator legs 56 of the platform 54.

Chamber 29 is then lowered over the canister 14 and a relay (not shown) opens the valve 108 to the roughing systems 104 (which runs constantly) until chambers 29 and 42 are evacuated to a pressure of approximately $10^{-3}$ torr in about 1½ minutes. After this, the platform 54 is lowered into one of the openings 73 in turntable 15 by them ram 64. The ram 64 continues down out of the way of the turntable 15. Since the volume of chambers 29 and 42 is quite small compared to the volume of chamber 11 the vacuum within chamber 11 is not materially disturbed when platform 54 is lowered onto turntable 15, nor does the entire system ever have to be let up to air except, of course, for maintenance purposes.

An automatic timing switch (not shown) actuates motor 76 to index the turntable 15 one position to station B for degassing purposes. At the same time completed work is being removed at station A and new work introduced.

The turntable 15 is then indexed another position to station C, the brazing station. Contactor 63 makes electrical contact with commutator 102 thus placing canister 14 at a high positive potential with respect to filaments 97. Electrons emitted by filaments 97 bombard canister 14, to heat the canister 14 and the brazing jig and parts within the canister 14 to brazing temperatures until the brazing material melts and seals. The use of the canister 14 provides uniform heat on the work load.

The turntable 15 is then indexed through the remaining stations D through J where the brazed articles are cooled within the chamber 11 before reaching station A again, where the platform 54 is lifted by ram 64 to the upper chambers 29 and 42. When a vacuum tight seal is created between platform 54 and plate 50, the vacuum within chamber 11 is isolated from the vacuum within chambers 29 and 42. At this time chambers 29 and 42 are let up to air by lifting chamber 29 and the completed work within canister 14 on platform 54 may then be removed.

The above provides a vacuum brazing system which lends itself readily to a continuous manufacturing process, permits moving of articles into and out of the system without disturbing the vacuum within the system and allows simultaneous brazing and cooling within the vacuum system. Thus, although the invention has been described in its preferred form with a certain degree of particularity, it is understood that the present disclosure of the preferred form has been made only by way of example. For example, the canister 14 might be reciprocally mounted within chamber 14 over the brazing station C. The workload would then be placed directly on platform 56, and when it reaches station C the canister 14 would be lowered over the workload. In this case only one canister 14 would be needed and would not have to be degassed each cycle. Numerous changes in the details of construction and the combination and arrangement of parts may be resorted to without departing from the spirit and scope of the invention as hereinafter claimed.

What is claimed is:

1. A vacuum brazing system comprising: an evacuable chamber having an entrance-exit port; means for evacuating said chamber in communication with said chamber; a plurality of spaced stations within said chamber; means for receiving articles to be brazed; a movable table serving to carry said article receiving means; a vacuum lock device comprising a moveable entrance-exit chamber having an open end for receiving said article receiving means therein; said entrance-exit chamber adapted to be mounted in gas tight communication to said evacuable chamber with said open end aligned with said entrance-exit port; said entrance-exit chamber forming, when so mounted a continuous vacuum wall with said evacuated chamber; door means for receiving thereon said article receiving means for isolating said entrance-exit chamber from said evacuated chamber and forming when closed a gas tight barrier therebetween; said door means mounted to transport said article receiving means between said entrance-exit chamber and said moveable table; and means for evacuating said entrance-exit chamber in gas tight communication therewith; means for moving said table whereby the article receiving means are sequentially indexed to each of said stations; and said stations including a brazing station, and at least one cooling station.

2. The system according to claim 1 including a degassing station.

3. The vacuum brazing system of claim 1 further comprising guide rod means for transporting said entrance-exit chamber to and away from said evacuable chamber, means for slideably supporting said entrance-exit chamber on said guide rod means, and a translatable shaft member mounted to said door means to transport said door means between said entrance-exit chamber port and evacuable chamber port interface and said moveable table; and wherein said brazing station includes a means for emitting electrons, and said article receiving means is adapted to be raised to a positive potential with respect to said electron emitting means to effect electron-bombardment heating of said article-receiving means.

4. The system according to claim 3 wherein said article receiving means forms an oven about said parts to be brazed.

5. A vacuum brazing system comprising: an evacuable chamber having a wall defining at least one port for introducing and withdrawing particles from said chamber; means for evacuating said chamber in communication with said chamber; means for transferring articles in said chamber between a plurality of spaced stations within said chamber; at least one of said stations being a brazing station and another being a cooling station whereby brazing and cooling may be carried on simultaneously; and a vacuum lock comprising a second chamber having a wall defining at least one port; said second chamber adapted to be mounted in gas-tight communication with said evacuable chamber so that said second chamber port is juxtaposed upon said evacuable chamber port; and door means adapted to form, when closed a gas tight barrier across said port of said evacuable chamber.

6. The system according to claim 2 wherein said means for evacuating said chamber comprises a cryopump and an electrical vacuum pump.

References Cited by the Examiner

UNITED STATES PATENTS

| | | | |
|---|---|---|---|
| 2,227,749 | 1/1941 | Gooder | 61—83 |
| 2,335,450 | 11/1943 | Sandberg | 61—83 |
| 2,746,420 | 5/1956 | Steingerwald. | |
| 3,018,358 | 1/1962 | Schaaf | 219—72 |
| 3,020,389 | 2/1962 | Gorman | 219—72 |
| 3,049,608 | 8/1962 | Greene | 219—117 |
| 3,116,998 | 1/1964 | Pagonis. | |
| 3,135,855 | 6/1964 | Barber | 219—72 X |

ANTHONY BARTIS, *Acting Primary Examiner.*

RICHARD M. WOOD, JOSEPH V. TRUHE, *Examiners.*